United States Patent
Zhu et al.

(10) Patent No.: US 9,307,505 B2
(45) Date of Patent: Apr. 5, 2016

(54) SYSTEM AND METHOD FOR ADJUSTING A POWER TRANSMISSION LEVEL FOR A COMMUNICATION DEVICE

(71) Applicant: BLACKBERRY LIMITED, Waterloo (CA)

(72) Inventors: Lizhong Zhu, Waterloo (CA); Qingmai Zhou, Waterloo (CA); Jun Xu, Scarborough (CA); Rudy Eugene Rawlins, Scarborough (CA); Michael Peter Montemurro, Toronto (CA); Fei He, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 476 days.

(21) Appl. No.: 13/796,759

(22) Filed: Mar. 12, 2013

(65) Prior Publication Data
US 2014/0274179 A1    Sep. 18, 2014

(51) Int. Cl.
  *H04W 52/18*   (2009.01)
  *H04W 52/36*   (2009.01)
  *H04W 52/24*   (2009.01)

(52) U.S. Cl.
  CPC .......... *H04W 52/367* (2013.01); *H04W 52/243* (2013.01)

(58) Field of Classification Search
  CPC .................................................. H04W 52/18
  See application file for complete search history.

(56) References Cited

U.S. PATENT DOCUMENTS

| | | |
|---|---|---|
| 2004/0066795 A1 | 4/2004 | Zhang |
| 2004/0176125 A1 | 9/2004 | Lee |
| 2004/0218620 A1 | 11/2004 | Palm et al. |
| 2004/0229621 A1 | 11/2004 | Misra |
| 2007/0224936 A1 | 9/2007 | Desai |
| 2008/0194280 A1 | 8/2008 | Thurfjell et al. |
| 2009/0047998 A1 | 2/2009 | Alberth, Jr. |
| 2009/0268675 A1 | 10/2009 | Choi |
| 2011/0021139 A1 | 1/2011 | Montgomery et al. |
| 2011/0081858 A1 | 4/2011 | Tolentino et al. |
| 2011/0086630 A1 | 4/2011 | Manssen |
| 2011/0136462 A1 | 6/2011 | Dimpflmaier et al. |
| 2011/0273999 A1* | 11/2011 | Nagaraja ............ H04B 7/15557 370/252 |
| 2012/0195243 A1 | 8/2012 | Choi |
| 2012/0270592 A1* | 10/2012 | Ngai ................... H04W 52/226 455/522 |
| 2012/0307749 A1 | 12/2012 | Banister et al. |

FOREIGN PATENT DOCUMENTS

| | | |
|---|---|---|
| EP | 2187673 A1 | 5/2010 |
| WO | WO 2004/066077 A2 | 8/2004 |
| WO | WO 2006/000617 A1 | 1/2006 |
| WO | WO 2011/006847 A1 | 1/2011 |

* cited by examiner

*Primary Examiner* — Bobbak Safaipour
(74) *Attorney, Agent, or Firm* — Perry + Currier Inc.

(57) ABSTRACT

A system, method and device for adjusting a communication parameter for a network communicating with a communication device are provided. The method comprises: monitoring for a condition relating to a first network that has been in communication with the communication device; and determining whether an adjustment is to be implemented on a communication parameter of a second communication network that has been in communication with the communication device based on the condition and if so, implementing the adjustment to the communication parameter for the second communication network.

20 Claims, 4 Drawing Sheets

SYSTEM AND METHOD FOR ADJUSTING A POWER TRANSMISSION LEVEL FOR A COMMUNICATION DEVICE

FIELD OF DISCLOSURE

The disclosure describes generally a system and method for adjusting a transmission characteristic for a communication sent from a communication device in a communication network. In particular, the disclosure relates to adjusting a power transmission level of communications sent from a device to a communication network depending on conditions detected by the device relating to another communication network.

BACKGROUND OF DISCLOSURE

Wireless mobile communication devices perform a variety of functions to enable mobile users to stay organized and in contact with others in a communication network through e-mail, schedulers and address books. Wireless devices are designed to enter and leave different wireless networks.

A communication device may have multiple simultaneous connections to multiple networks. Transmissions and communications to multiple networks simultaneously require management of all aspects of communications for both networks. Operating regulations for one communication network may affect how communications for another network are provided. There is a need to enhance operating parameters for one or both networks for the communication device in such environments.

BRIEF DESCRIPTION OF THE DRAWINGS

Embodiments of the disclosure will now be described, by way of example only, with reference to the accompanying drawings, in which.

DESCRIPTION OF EMBODIMENTS

Figure 1:
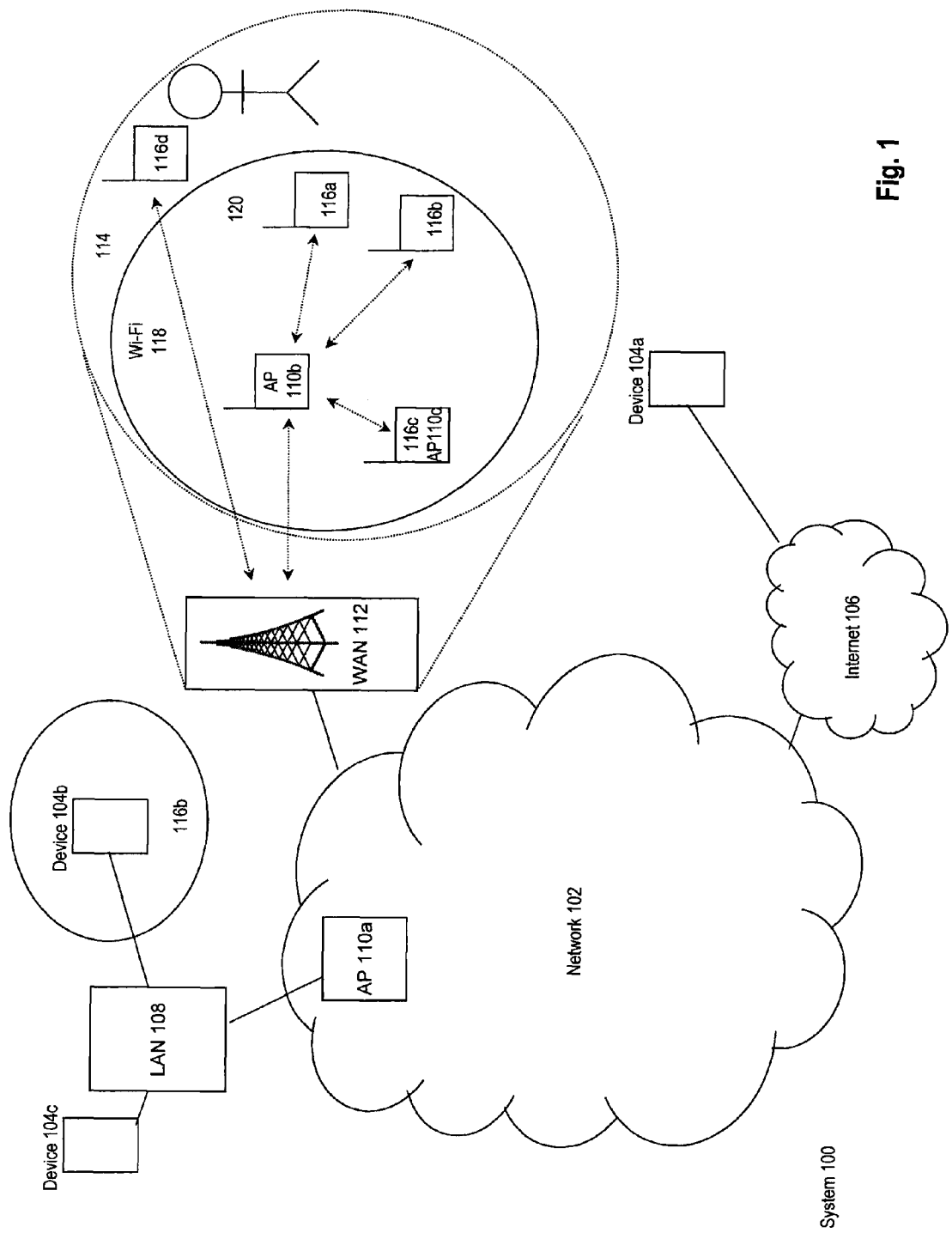
FIG. 1 is a schematic diagram of a communication system including a wireless cellular communication network and a wireless local area network (WLAN) that are both communicating with a communication device according to an embodiment.

Exemplary details of embodiments are provided herein. The description that follows and the embodiments described therein are provided by way of illustration of an example or examples of particular embodiments of principles of the present disclosure. These examples are provided for the purposes of explanation and not limitation of those principles and of the disclosure. In the description that follows like parts are marked throughout the specification and the drawings with the same respective reference numerals.

Briefly, an embodiment provides systems, methods, processes and devices for detecting or monitoring current and new connection(s) to networks by a communication device. Depending on the status of the connections, an embodiment can initiate adjustments for communication parameters that the communication device implements to communicate with one of the networks. In particular, an embodiment may detect a connection to a first network for the communication device and depending on one or more characteristics of the connection; an embodiment may adjust a communication parameter that the device is using for a second communication network. For example, an embodiment can monitor/detect whether the communication device has a connection to a first network and when it is determined that the connection is present, an embodiment may decrease power of transmissions sent by the device to a second communication network. The adjustment may be made in order to comply with regulations associated with the first network. Additionally or alternatively, depending on different connection conditions of the first network (e.g. a non-detection of a connection to the first network), the communication network may increase the power of transmissions to the second network. Generally, an adjustment may be made to communications with one network depending on detected characteristics of a second network.

In a first aspect, a method of adjusting communication parameters for networks communicating with a communication device is provided. The method comprises: monitoring for a condition relating to a first network that has been in communication with the communication device; and determining whether an adjustment is to be implemented on a communication parameter of a second communication network that has been in communication with the communication device based on the condition and if so, implementing the adjustment to the communication parameter for the second communication network.

In the method, the first network may be a cellular communication network; and the condition may be detection of a connection to the cellular communication network.

In the method, the adjustment may be a reduction in a transmission power level for communications sent by the communication device over the second communication network.

In the method, the reduction in the transmission power level may enable the communication device to comply with a specific absorption rate (SAR) limit for transmissions sent from the communication device.

In the method, a transmission band associated with the cellular network may determine a level of the reduction. Further, in the method, the transmission band may be a GSM band.

The method may further comprise: monitoring for a second condition relating to the first network that has been in communication with the communication device; and determining whether a further adjustment is to be made to the communication parameter of the second communication network that has been in communication with the communication device based on the second condition and if so, implementing the further adjustment to the communication parameter for the second communication network.

In the method, the second condition may be a loss of the connection to the cellular communication network; and the further adjustment may be an increase in the transmission power level for communications sent by the communication device over the second communication network.

In the method, the adjustment may be to change a channel for communications sent by the communication device over the second communication network.

In the method, the adjustment may be to periodically place the communications sent by the communication device in a sleep mode.

In the method, the second communication network may be a WLAN.

In the method, the communication device may be an access point (AP) in the second communication network; and the adjustment is may be a reduction in a transmission power level for communications sent by the communication device over the second communication network.

In the method, the communication device may be a station in the second communication network communicating with a second communication device that is an access point (AP) for the second communication network; the adjustment may be a reduction in a transmission power level for communications sent by the communication device over the second communication network; data for a first adjustment level for the reduction is provided to the communication device; and the communication device may select either the first adjustment or the second adjustment level as the adjustment for communications sent by the communication device over the second communication network.

In the method, the communication device may select the greater reduction provided by either the first adjustment or the second adjustment level as the adjustment for communications sent by the communication device over the second communication network.

In the method, the first network may be a cellular communication network; and the condition may be determination of the communication device being at a predetermined location.

In the method, the first network may be a cellular communication network; and the condition may be determination of the communication device being in a predetermined orientation.

The method may further comprise providing updated data for the first adjustment level for the reduction reflecting a further adjustment level conforming to a new regulatory requirement.

In the method, the first network may be a cellular communication network; the second network may be a WLAN; the condition may relate to communication frequencies used in the cellular network and communication frequencies used by the device for communications to the WLAN; and the adjustment may be a reduction in a transmission power level for communications sent by the communication device over the WLAN. The reduction may follow a back-off scheme to reduce intermodulation distortion at the cellular network In a second aspect, a system method for adjusting communication parameters for networks communicating with a communication device is provided. The system comprises: a processor; a memory module for storing instructions for execution on the processor; and a monitoring module for providing instructions for execution on the processor. The instructions are to monitor for a condition relating to a first network that has been in communication with the communication device; and to determine whether an adjustment is to be made to a communication parameter of a second communication network that has been in communication with the communication device based on the condition and if so, to implement the adjustment to the communication parameter for the second communication network.

In the system, the adjustment may be a reduction in a transmission power level for communications sent by the communication device over the second communication network to enable the communication device to comply with a SAR limit for transmissions sent from the communication device; and a transmission band associated with the cellular network may determine a level of the reduction.

In the system, the monitoring module may provide further instructions for execution on the processor to: monitor for a second condition relating to the first network that has been in communication with the communication device; and determine whether a further adjustment is to be made to the communication parameter of the second communication network that has been in communication with the communication device based on the second condition and if so, implement the further adjustment to the communication parameter for the second communication network.

In the system, the first network may be a cellular communication network; the second network may be a WLAN; the condition may relate to communication frequencies used in the cellular network and communication frequencies used by the device for communications to the WLAN; and the adjustment may be a reduction in a transmission power level for communications sent by the communication device over the WLAN. The reduction may follow a back-off scheme to reduce intermodulation distortion at the cellular network.

In other aspects, various combinations of sets and subsets of the above aspects are provided.

Before discussing details on specific features of an embodiment, a description is provided on a system where a communication device according to an embodiment is capable with establishing, monitoring and configuring communication parameters with one or more networks in the system. Then, details are provided on an exemplary device in which an embodiment operates.

Referring to FIG. 1, details of a system of exemplary networks and communication devices according to an embodiment are provided. FIG. 1 shows communication system 100 where network 102 provides access to a suite of applications, services and data to its connected devices 104 (and other devices) through its associated servers. Network 102 may be implemented in any known architecture, providing wired and/or wireless connections to its elements. It will be appreciated that in other embodiments, various networks and subnetworks as described herein may be incorporated into other networks.

Internet 106 may be connected to network 102 providing a connection for device 104a to network 102. Local area network (LAN) 108 is connected to network 102 and provides local wired and wireless connections to its devices 104b and 104c. Access point (AP) 110a provides a connection within network 102 to LAN 108.

An exemplary wireless network provides wireless communication coverage to devices that are located within the wireless transmission area of the Wide Area Network (WAN). In FIG. 1, one exemplary wireless network is a WAN 112 having a transmission area defined schematically by circle 114. Devices 116 may have wireless communication capabilities with one or more different wireless networks. WAN 112 may have multiple transmission areas by having multiple communication towers.

A WAN network may be provided by a cellular communications company, such as Verizon™. WAN 112 may be referred to herein as cellular network 112. Wireless devices 116a-d communicate through a data link layer in cellular network 112. In an exemplary environment, cellular network 112 is a local, geographically small, wireless network. Wireless devices 116 include handheld devices, cell phones and computers (either desktop or portable) having a (wireless) network card, network adapter and/or network interface controller ("NIC") installed therein.

Devices 116a-d and AP 110a may move within network 112 and its area 114. As such, connection characteristics of signals received by devices 116a-d from network 112 may dynamically change, with the quality of the connections provided for an area ranging among non-existent, poor, adequate, good and excellent (with values in-between). Several characteristics of the connection may determine its quality, such as the strength of the RF signal in the connection, error correction procedures conducted for the connection, redundant transmissions made for communications over the connection, and others. Additionally, use of the current connection and its frequencies may be subject to restrictions for a device in network 112, such as device 116a.

In system 100, network 118 in one embodiment is a Wi-Fi network that provides an overlapping network for devices 116a-c and AP 110b simultaneously with network 112. Further details of a Wi-Fi network are provided below.

First, operating parameters for exemplary network 118 follow standards set by the IEEE LAN/MAN Standards Committee, known as IEEE 802, through its working group "11". The IEEE 802.11 standard defines media access control (MAC) and physical (PHY) layers in the OSI protocol model for a wireless local area network (WLAN). A Wi-Fi network is one type of WLAN. Currently, the family of IEEE 802.11 amendments encompass six wireless modulation techniques that all use the same communication protocol among their communicating elements. Other modulation techniques may be used. Current versions of IEEE 802.11 networks include: IEEE 802.11a, b, g and n, representing PHY amendments to IEEE 802.11. The IEEE 802.11 working group defines numerous distinct frequency ranges for transmission frequencies, e.g. so-called "white spaces" of the VHF/UHF television transmission bands (namely frequencies that are unused or underutilized geographically or temporally as specified in a geo-location database or its proxy server), 2.4 GHz, 3.6 GHz, 4.9 GHz, 5.0-6.0 GHz bands and other bands. Each frequency range may be divided into sets of channels. Communications can be specified to be carried on a particular channel for a particular band. Specific transmission details and parameters of these networks and channels are known to those of skill in the art. Network 118 may be referred to herein as WLAN 118.

For an IEEE 802.11 network, a station ("STA") is a basic component in the network. A station is any device that implements the functionality of an IEEE 802.11 protocol. It may (or may not) have a connection to a WLAN infrastructure. By convention generally, a station is an integral part of a WLAN. A station may be any device, including a laptop computer, device 104, wireless device 116 or AP 110. By convention, the term station is used for a mobile device and a station is understood to support the IEEE 802.11 station services of authentication, de-authentication, privacy and data delivery.

Network 118 has AP 110b, which supports radio transmission equipment known to those skilled in the art. AP 110b is a communication device that contains an IEEE 802.11 radio receiver/transmitter (or transceiver) and functions as a bridge between network 112 and other networks (such as network 102, Internet 106 and/or LAN 108) for its carried communications. As such, AP 110b establishes a Wi-Fi network which happens to be operating within WAN 112.

Wi-Fi network 118 has a transmission area denoted by circle 120 and covers devices 116a-c. Device 116d is shown as being inside network 118 and its transmission area 114, but outside the transmission area 120 for the Wi-Fi network surrounding AP 110b. Bi-directional arrows connecting AP 110b to devices 116a-c show individual connections established for those devices to AP 110b. AP 110b provides data distribution services among devices 110/116 within area 120 under network 118 simultaneously with communications provided by network 112. AP 110b may be a wireless device and as such AP 110b is effectively another wireless device 116.

An IEEE 802.11 network may be implemented in one of many network modes. An "ad hoc" IEEE 802.11 mode allows devices to operate in an independent basic service set (IBSS) network configuration. With an IBSS, there are no access points. Clients in a network communicate directly with each other in a peer-to-peer manner. One ad hoc network follows the Wi-Fi Alliance's Peer-to-Peer (P2P) Technical Specification, as defined by the Wi-Fi Alliance Technical Committee P2P Task Group. In an exemplary P2P group, a set of P2P devices communicate with each other. A P2P device have several characteristics. For example, it may: function as a P2P group owner ("GO") as an administrator and/or as a P2P client; conduct negotiations to assume a P2P GO role or P2P client role; provide network configuration (such as Wi-Fi Simple Configuration or WSC) and network discovery operations; and support WLAN and P2P concurrent operations. A P2P GO may provide: "AP-like" roles of BSS functionality and services for associated clients in the network (for example P2P clients or legacy clients); network configuration registrar functionality; communication with associated clients; and access to a simultaneous WLAN connection for its associated clients. In another configuration, network 118 may be an "ad-hoc" network.

"Hotspot" functionalities for AP 110b may be provided in devices 116. For example, device 116c may have capabilities to be another Wi-Fi hotspot host and operate as AP 110c. As AP 110b is the data distribution point for its Wi-Fi network, it will be seen that the transmission area is focussed around AP 110b.

In an IEEE 802.11-class network, messages are sent between its AP 110 and its communicating devices 116 in data transmissions called frames. Most frames are sent and processed in a "send-and-respond" protocol. Additional materials relating to frames are provided in published IEEE 802.11 Working Group materials.

A beacon frame is a type of a management frame that is periodically broadcast by an AP 110 to provide a signal of its presence to the communication boundaries of its network. The typical period of transmission of a beacon frame is about every 100 ms. The current IEEE 802.11 standards set the period to be 102.4 ms. A beacon frame is used as a synchronizing signal for transmitting broadcast and multicast traffic to devices in the associated network. Immediately following the beacon frame, if broadcast or multicast traffic is queued to be provided, such traffic is transmitted by AP 110 through its network 118. For device 116a to maintain/establish communications with AP 110b (and its related network 118), device 116a may need to receive and respond to a beacon frame sent from AP 110b. Under Wi-Fi constructs, device 116a can initiate an active scan or a passive scan to scan for beacon frames.

Figure 2:
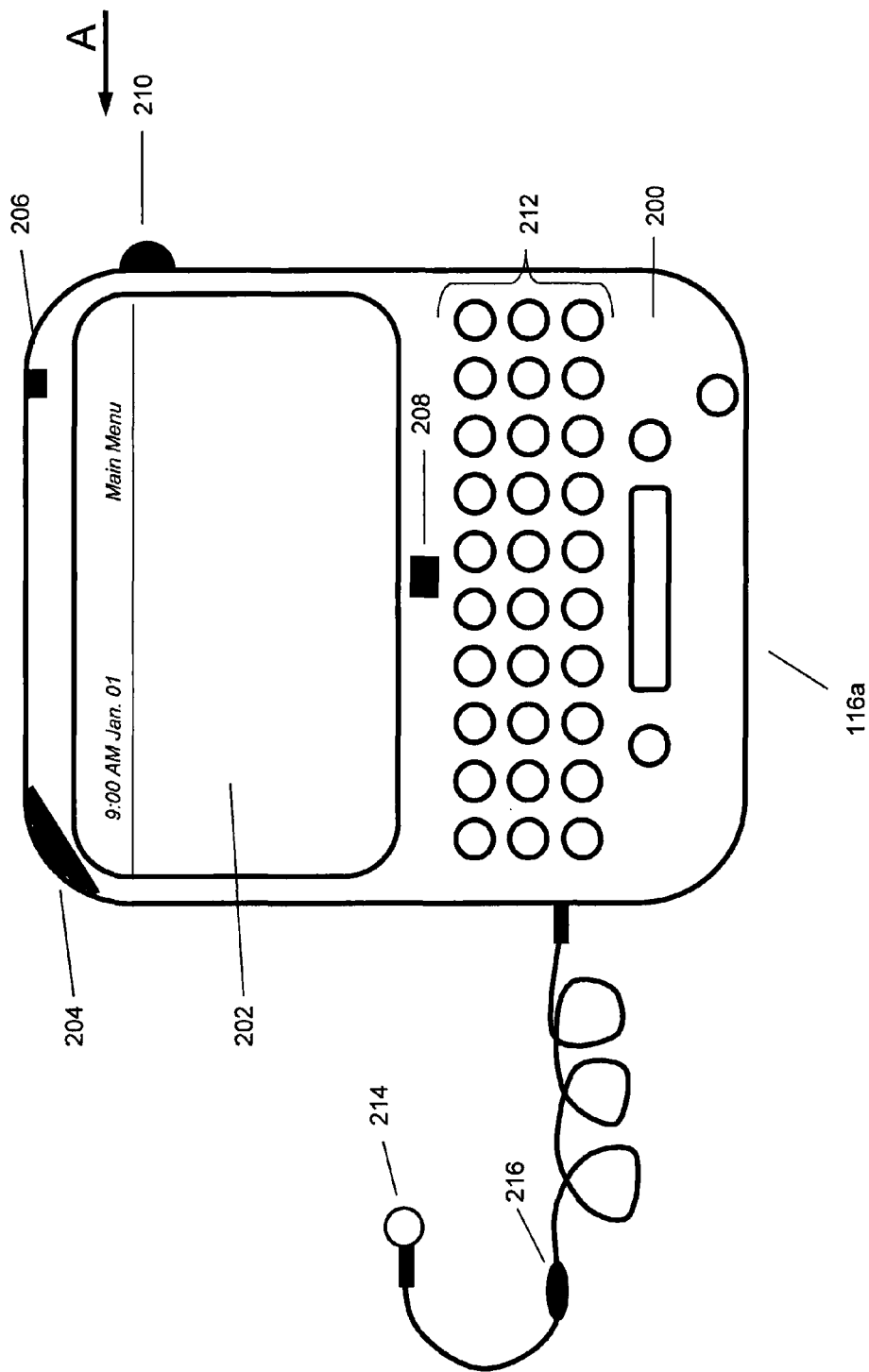
FIG. 2 is a schematic representation of the communication device of FIG. 1 according to an embodiment.

Now, details are provided on an exemplary device according to an embodiment. FIG. 2 provides general features of device 116a in accordance with an embodiment of the disclosure. These features may also be present in AP 110b and devices 104.

In the present embodiment, device 116a is based on a computing platform having functionality of an enhanced personal digital assistant with cellphone and e-mail features. Device 116a is a processor-controlled device (not shown). Software applications operating on device 116a control its operations and network connections to implement the above-noted three features. Further detail on selected applications for an embodiment is provided later. It is understood that device 116a may be based on construction design and functionality of other electronic devices, such as smart telephones, desktop computers, pagers or laptops having telephony equipment. In a present embodiment, device 116a includes a housing 200, an LCD 202, speaker 204, an LED indicator 206, an input device 208 (which may be a trackpad, trackball, thumbwheel or other input device), an ESC ("escape") key 210, keypad 212, a telephone headset comprised of an ear bud 214 and a microphone 216. Ear bud 214 may be used to listen to phone calls and other sound messages and microphone 216 may be used to speak into and input sound messages to device 116a. ESC key 210 may be inwardly depressed along the path of arrow "A" as a means to provide additional input to device 116a. It will be understood that housing 200 may be made from any suitable material as will occur to those of skill in the art and may be suitably formed to house and hold all components of device 116a.

Device 116a is operable to conduct wireless telephone calls, using any wireless phone system. Exemplary technologies are any known wireless phone systems such as a Mobitex™ network, a DataTAC™ network, a General Packet Radio Service (GPRS) network and also a variety of data and voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), Wi-Fi networks, 3GPP Long Term Evolution (LTE) networks, etc. Cellular networks for a given technology may operate in one or more bands and may have one or more channels for a particular band. For example, GSM networks may operate in one of three bands (900/1800/1900 MHz or 850/1800/1900 MHz) or in one of four bands (850/900/1800/1900 MHz). For a particular cellular network, device 116a may be operable to communicate in one or more bands. A band may be divided into a set of channels, where each channel occupies a particular subset of the spectrum of the band. For a LTE network, its standard supports packet switching in an IP network. As voice calls in GSM, UMTS and CDMA 2000 are circuit switched, three different implementations have been developed to support voice calls in an LTE network:

VoLTE (Voice Over LTE), which is based on a IP Multimedia Sub-system (IMS) network;

CSFB (Circuit Switched Fallback), where device 116a initially provides only data services and when a voice call is to be initiated or received, device 116a reverts to a circuit switched network; and SVLTE (Simultaneous Voice and LTE), where device 116a operates simultaneously in LTE and circuit switched (CS) modes.

Other wireless communication systems that device 116a may support may include Wireless WAN (IMS), Wireless MAN (Wi-Max or IEEE 802.16), Wireless LAN (IEEE 802.11), Wireless PAN (IEEE 802.15, Zigbee and Bluetooth), high-speed data packet access (HSDPA) networks, Evolved High Speed Packet Access (HSPA+) networks, etc. and any others that support voice and data. Additionally, a Bluetooth network may be supported. Other embodiments include Voice over IP (VoIP) type streaming data communications that may simulate circuit-switched phone calls. Device 116a may have capabilities of communicating with other devices using other communication technologies, including instant messaging (IM) systems, text messaging (TM) systems and short message service (SMS) systems.

Device 116a may operate as a dual-mode modem. Its mobile data communication functions allow it to make WAN connections and allow it to deliver voice and e-mails to user of device 116a. Overall throughput between AP 110b and device 116a may depend on an instantaneous wireless signal quality of two PHY layers, namely a Physical Coding Sublayer (PCS) and a Physical Medium Dependent (PMD) layer. The PCS encodes and decodes the data that is transmitted and received.

Device 116a may have modules to provide near field communication (NFC), allowing it to communicate wirelessly with another device when the two devices are placed in very close proximity to each other. NFC technologies are an extension of the ISO 14443 proximity-card standard as a contactless card, Radio Frequency Identification (RFID) standard that incorporates the interface of a smart card and a reader into one device. A NFC-enabled device, such as device 116a, typically includes an NFC integrated circuit (IC) that communicates to such devices as existing ISO 14443 smart cards and readers and other NFC devices and compatible with any existing contactless infrastructure. The NFC ICs may magnetic field induction where two loop antennas are located near each other and form an air-core transformer. The NFC technology operates on an unlicensed radio frequency ISM band of about 13.56 MHz and has a bandwidth of about 2 MHz. The working distance for the two devices is usually about between 0 and 20 centimetres. In use, a user of a first NFC device brings it close to another NFC enabled device or tag to initiate NFC communication. NFC data rates range from about 106 to 424 kbit/s.

Now, details are provided on an embodiment that provides processes, methods, devices and systems to analyze characteristics of a connection to a first communication network and based on the analysis, selectively adjusts a connection parameter for a second communication network. In particular, adjustments can be made to a transmission power for signals sent by the communication device to the second (wireless) communication network. The terms "adjustment" and "adjust" as used herein are provided with a wide scope of meaning. In adjusting a parameter of an operation, the parameter may be increased, decreased or changed in how it controls the operation. For example, adjustments may be provided to: increase or decrease a level of transmission power for transmission signals; change a transmission band used to carry the signals; change a channel parameter; and/or increase or decrease a frequency of the signals sent by the device over the second network. In another embodiment, adjustments to parameters may be made that affect how received transmissions are processed (e.g. frequency of scans, change of scan frequencies, etc.).

Further details on exemplary adjustments made to transmission parameters are provided below. Generally, an embodiment manages the power of transmissions sent over a communication network from device 116a in view of external conditions, regulations and/or parameters that may have imposed a condition on the strength of such transmissions. For a given condition that is imposing a transmission restriction, a set of operating parameters (such as a maximum or minimum power transmission) for a network can be utilized. The operating parameters may have been determined in part through experimentation. When device 116a changes an operating state of one or more of its wireless communication transmission links (which affects its various transmission radios), device 116a may access the set of operating parameters to determine any new operating parameters and implement same. One embodiment monitors signals received by a communication device in a cellular network (as an exemplary first network) and depending on an analysis of such signals, adjustments may be made to a power level of communications transmitted by the communication device to a WLAN (as an exemplary second network). An embodiment may utilize a received signal strength of transmissions (if any) from a network to determine whether a connection to that network is active or not.

For one embodiment, it is noted that a regulatory body in a jurisdiction may set regulations as to various communication parameters for communication devices and communication networks. For example, in the U.S. the Federal Communication Commission (FCC) has established limits for deemed safe exposure levels to radio frequency (RF) energy for communication devices. These limits are expressed as a Specific Absorption Rate (SAR), which is a measure of the amount of RF energy absorbed by a user's body when using a mobile communication device that is held near the user.

To meet current FCC SAR limits, a communication device may limit the power of transmissions sent from its antennae for transmissions sent over one or more networks. Generally, the lower the power of the transmission, the lower the amount of energy in the transmission that is absorbed by the user's body. The total amount of energy absorbed may also be decreased by decreasing the total amount of transmissions sent from the communication device to one or more networks. Parameters for such regulations may be amended from time to time. New regulations and requirements may be implemented.

As such, for an embodiment, an exemplary device 116a may have connections to two or more networks simultaneously (e.g. WAN 112 and Wi-Fi network 118). In order to comply with FCC SAR limits, the power of transmissions sent by device 116a for either or both of WAN 112 and Wi-Fi network 118 may be dynamically adjusted (e.g. reduced depending on circumstances). It will be appreciated that when device 116a is simultaneously in communication with networks 112 and 118, the SAR level will be higher than when device 116a is communicating with only one of networks 112 and 118 (presuming the same transmission parameters for each network are maintained). As such, an embodiment adjusts transmission parameters for signals transmitted from device 116a depending on an analysis of current connection(s) to network(s).

For an embodiment, when communication device 116a detects that it is in communications with WAN 112, device 116a may adjust communication parameters of transmissions sent to network 118 to reduce the net or average power of signals sent to network 118. As noted above, one parameter that may be adjusted is a power level of transmissions sent from device 116a, which will have an effect of reducing the SAR reading. For example, the power used to transmit signals from device 116a over network 118 may be reduced from a current or default power transmission level while the power transmission level for transmissions sent to network 112 may be maintained. Additionally or alternatively, the power transmission levels for both networks 112 and 118 may be adjusted. Each power level may be adjusted to a separate new level.

One embodiment provides a dynamic transmission power back-off mechanism for WLAN transmissions (such as to adjust a transmission power parameter as a constraint) depending on operating state(s) of WLAN and cellular radios (which receive and transmit signals to device 116a for each network). Herein, the term "radio" is used generically to refer to any module or set of modules that transmits or receives wireless signals (e.g. a WLAN radio, a Bluetooth radio, an LTE radio, etc.) for device 116a.

In one embodiment, values for transmission power adjustments are provided in one or more configuration tables that establish ranges of WLAN transmission power levels used depending on what networks, if any, are detected by device 116a. Exemplary states include:

- A state of a connection to cellular network 112 for device 116a, which may include the current radio state (ON, OFF, sleep mode) and current operating band(s) for the network; and
- A state of a connection to WLAN 118 for device 116a, which may include the current operating mode of device 116a in a WLAN. For example, different parameters may be set depending on whether device 116a is operating as a station, an AP, a mobile handset/Group Owner (GO) and also the current operating channel(s)/band(s) for the WLAN.

It will be appreciated that in assessing a state of a connection, the state may be any of a current state, a recent state or an expected state.

The following Tables A and B illustrate exemplary adjustments that are implemented for power levels of transmissions sent by device 116a over network B when a connection is detected to network A. Power adjustment values in Table A are expressed as a relative reduction in a power level (in dB) or in an absolute power level (in dBm). As an absolute power level, a 20 dBm output signal is considered to be an exemplary output level. In Table A, an AP mode (ON or OFF) for device 116a is a mode where device 116a can operate as an AP for a WLAN network (such as network 118). The AP mode may be activated or deactivated by an operator of device 116a or it may be activated or deactivated autonomously by device 116a or through an externally received command. For example, after the AP mode is ON, it may be subsequently disabled due to roaming of device 116a or loss of a connection to a supporting network. Typically, a connection to a 3G or better cellular network is preferred.

TABLE A

| | Network B (values for power reductions expressed in dB; absolute power values expressed in dBm) | | | | |
|---|---|---|---|---|---|
| Network A (Cellular network detected) | Wi-Fi 2.4 GHz (b, g, n) | Wi-Fi 5 GHz (a, n) | Cellular cutoff for AP mode SAR, with no WLAN power back-off | Cellular cutoff for AP mode SAR, with WLAN power back-off | LTE cutoff when SVLTE mode WLAN + CDMA + LTE radios are ON |
| Network OFF (not detected) | Adjustment not needed (ANN) | See Table B, column B for adjustment level for the current channel for network B | ANN | ANN | ANN |

TABLE A-continued

Network B (values for power reductions expressed in dB; absolute power values expressed in dBm)

| Network A (Cellular network detected) | Wi-Fi 2.4 GHz (b, g, n) | Wi-Fi 5 GHz (a, n) | Cellular cutoff for AP mode SAR, with no WLAN power back-off | Cellular cutoff for AP mode SAR, with WLAN power back-off | LTE cutoff when SVLTE mode WLAN + CDMA + LTE radios are ON |
|---|---|---|---|---|---|
| GSM 850 | ANN | See Table B, col. C for adj. level for the cur. ch. for net. B | ANN | ANN | ANN |
| GSM 1900 | ANN | As above | ANN | ANN | ANN |
| GSM 900 | ANN | As above | ANN | ANN | ANN |
| GSM 1800 | ANN | As above | ANN | ANN | ANN |
| HSPA + Band 1 | ANN | As above | ANN | ANN | ANN |
| HSPA + Band 2 | ANN | As above | ANN | ANN | ANN |
| HSPA + Band 5 | ANN | As above | ANN | ANN | ANN |
| HSPA + Band 8 | ANN | As above | ANN | ANN | ANN |
| CDMA Band BC0 | ANN | As above | 2 dB (21 dBm) | ANN | ANN |
| CDMA Band BC1 | ANN | As above | 1 dB (22 dBm) | ANN | ANN |
| LTE Band 4 | ANN | As above | 5 dB (19 dBm) | 9 dB (15 dBm) | 9 dB (15 dBm) |
| LTE Band 13 | ANN | As above | 5 dB (19 dBm) | 6 dB (18 dBm) | 6 dB (18 dBm) |
| SVLTE Bands CDMA BC0 LTE 4 | ANN | See Table B, col. D for adjust. level for cur. ch. for net. B | ANN | ANN | ANN |
| SVLTE Bands CDMA BC 0 LTE13 | ANN | As above | ANN | ANN | ANN |
| SVLTE Bands CDMA BC1 LTE 4 | ANN | As above | ANN | ANN | ANN |
| SVLTE Bands CDMA BC1 LTE 13 | ANN | As above | ANN | ANN | ANN |

Table B describes exemplary new SAR adjusted maximum power reduced from the representative 20 dBm output power for device 116a.

TABLE B

| | Power adjustment level | | |
|---|---|---|---|
| Current Wi-Fi channel | Column B: Power adjustment reduced from the max. power for passing standalone WLAN SAR | Column C Power adjustment from the max. power when both cellular and WLAN transmitters are ON in device 116a | Column D Power adjustment from the max. power when device 116a is in SVLTE mode and when its WLAN + CDMA + LTE transmitters are ON |
| Channel 36 to Ch. 64 | n/a | 19 dBm | 18 dBm |
| Ch. 100 to Ch. 140 | n/a | 19 dBm | 16 dBm |
| Ch. 149 to Ch. 165 | n/a | 15 dBm | 14 dBm |

Adjustment (and non-adjustment) values in Tables A and B have been determined through experimentation. In other embodiments, variations may be provided for any of the values. In other embodiments additional operational data may be collected or determined to identify other maximum or preferred transmission power levels for WLAN transmissions depending on the current state of connections to WLAN and cellular networks. Preferably, the data would be translated into various states of operation of device 116 and preferred/maximum transmission levels for device 116 for various networks for each state. Preferably, the data in the tables provide power levels that are independent of WLAN chipsets that are available to device 116a. Also, the data and an interface for implementing power changes (or other adjustments) can be modified to accommodate for transmission requirements and guidelines for technological, regulatory and administrative changes to WLAN, cellular (including LTE) and other communication technologies.

While values in Tables A and B describe specific exemplary parameters to reduce transmission level for communications sent from device 116a to networks 112 and/or network 118, in other embodiments other conditions may be defined for situations where power for transmissions is increased. For example, in a situation where no cellular network is detected (even after a network was previously detected), it may be permissible to increase the transmission power for network 118 (or other networks) as SAR limits may not be applicable. Also, in other embodiments, other values for the Tables may be provided so that the adjustments meet a particular transmission requirement for a particular situation. This may entail having some transmissions boosted in certain circumstances and the same transmissions reduced in others.

For example, if device 110a is detected to be outside a jurisdiction of a particular regulation (e.g. outside the U.S.), then a different set of parameter tables may be provided, where increases and decreases to output transmissions for different networks is provided. Determination of a location of device 110a may be provided by GPS data, cellular tower location data, telephone number coding or through other mechanisms.

To implement the adjustments provided by Tables A and B, as an example if device 116a detects communications from a GSM 850 MHz band cellular network and also detects a 5 GHz Wi-Fi network (in Table A), then an embodiment looks up the corresponding values in Table B as noted in the intersecting entry in Table A for a GSM 850 network and a 5 GHz Wi-Fi network for the suggested adjustment parameters. Based on the current channel of the 5 GHz Wi-Fi network, in Table B, the output transmissions are reduced in power to an absolute value of either 19 dBm, 19 dBm or 15 dBm.

As an extension of information on parameters provided above, Table C provides a template for additional status conditions that may be monitored and additional adjustments to power transmission(s) that may be implemented. In particular, Table C considers power transmission levels when device 116a is operating in different states for its WLAN radio. The AP mode places both the WLAN and cellular radios in different operating states. A WLAN radio normally operates in STA mode. One embodiment tracks parameters of connections/operating conditions for device 116a as follows, where each state has separate power parameters for its networks:

AP mode of device 116a (ON or OFF);
Cellular radio in device 116a (ON or OFF); and
SVLTE (CDMA+LTE) connection status for device 116a (ON or OFF/connected or not connected).

Once a state of connections/operation of device 116a is determined, communication parameters provided in Table C below may be used to implement such adjustments. Specific values in each of the columns in Table C may be provided through experimentation or may be derived from other data (e.g. from Tables A and B).

TABLE C

| WLAN/Cellular State | Cellular OFF | Cellular ON/SVLTE Disabled | Cellular ON/SVLTE Enabled |
|---|---|---|---|
| AP mode OFF - 2.4 GHz | N/A | — | — |
| AP mode OFF - 5 GHz (Low band - ch 36-ch 64) | 0 dB (19 dBm) | 0 dB (19 dBm) | 4 dB (15 dBm) |
| AP mode OFF - 5 GHz (Med. band - ch 100-ch 140) | 0 dB (19 dBm) | 0 dB (19 dBm) | 1 dB (18 dBm) |
| AP mode OFF - 5 GHz (High band - ch 149-ch 165) | 2 dB (17 dBm) | 0 dB (17 dBm) | 4 dB (13 dBm) |
| AP mode ON | N/A | — | — |

In another embodiment, adjustments may be made to transmissions generated and sent by device 116a in other transmission bands, such as transmissions carried on un-used portions of the transmission spectrum. For example, in certain jurisdictions (e.g. in Europe), the unused transmission spectrum for white space television transmission bands (or other transmission bands, such as above the 60 GHz range—the Wi-Gig range—for which transmissions are currently not regulated) may be used as part of communications processed by device 116a. Power for transmissions generated and sent by device 116a for such white space transmissions (or other transmissions) may be adjusted by an embodiment when a predetermined network condition is detected. It will be appreciated that in operation, when a set of transmission parameters has been defined for an embodiment, additional parameters for new radio (WLAN, cellular or other) conditions may be defined and incorporated into the existing parameters by adding data for the new parameters as additional dimension(s) for the data provided in the Tables as noted. As such, additional parameters for whitespace and Wi-Gig transmissions may be treated as additional independent radios and the Tables can be expanded to incorporate new rows and columns to recite their operating parameters and conditions for implementation.

Table D provides a simplified table of maximum transmission levels (in dBm) for cellular (C) and WLAN (W) transmissions sent from device 116a depending on the current cellular operation mode and WLAN operation mode for device 116a. For a given operating state and operating channel, an embodiment provides a set of power transmission limits for cellular and WLAN transmissions. The power limit for the radio is set (for each of the cellular radio and the WLAN radio) according to the values in Table D. As an extension, further transmission parameters can be defined and provided in additional tables for regulatory and SAR limits. Other data and tables can provide information on parameters for LTE co-existence mitigation and other conditions/situations that may require that a limit (or minimum) power level be imposed on one or more transmissions.

TABLE D

| WLAN/Cellular | | State | | | |
|---|---|---|---|---|---|
| | | SVLTE OFF | | SVLTE ON | |
| | | Band/Chan. | | | |
| State | Channel | LTE | UMTS | LTE | UMTS |
| Station/Wi-Fi Direct Client | 2.4 GHz | C: 20 dBm<br>W: 18 dBm | C: 20 dBm<br>W: 18 dBm | C: 20 dBm<br>W: 18 dBm | C: 20 dBm<br>W: 18 dBm |
| | 5 GHz UNI 1 | C: 20 dBm<br>W: 18 dBm | C: 20 dBm<br>W: 18 dBm | C: 20 dBm<br>W: 18 dBm | C: 20 dBm<br>W: 18 dBm |
| | 5 GHz UNI 2 | C: 20 dBm<br>W: 18 dBm | C: 20 dBm<br>W: 18 dBm | C: 20 dBm<br>W: 18 dBm | C: 20 dBm<br>W: 18 dBm |
| | 5 GHz UNI 3 | C: 20 dBm<br>W: 18 dBm | C: 20 dBm<br>W: 18 dBm | C: 20 dBm<br>W: 18 dBm | C: 20 dBm<br>W: 18 dBm |
| Access Point/ Wi-Fi Direct GO | 2.4 GHz | C: 20 dBm<br>W: 18 dBm | C: 20 dBm<br>W: 18 dBm | C: 20 dBm<br>W: 18 dBm | C: 20 dBm<br>W: 18 dBm |
| | 5 GHz UNI 1 | C: 20 dBm<br>W: 18 dBm | C: 20 dBm<br>W: 18 dBm | C: 20 dBm<br>W: 18 dBm | C: 20 dBm<br>W: 18 dBm |
| | 5 GHz UNI 2 | C: 20 dBm<br>W: 18 dBm | C: 20 dBm<br>W: 18 dBm | C: 20 dBm<br>W: 18 dBm | C: 20 dBm<br>W: 18 dBm |
| | 5 GHz UNI 3 | C: 20 dBm<br>W: 18 dBm | C: 20 dBm<br>W: 18 dBm | C: 20 dBm<br>W: 18 dBm | C: 20 dBm<br>W: 18 dBm |
| WLAN Off | | C: 20 dBm | C: 20 dBm | C: 20 dBm | C: 20 dBm |

For Table D, when the cellular network is OFF, the power for the WLAN transmissions is set to be 20 dBm. Other power levels may be used.

In other embodiments, an adjustment may be made to a power level of an outbound transmission depending on a desired or imposed data transmission throughput rate or desired effort to conserve (battery) power.

Other parameters instead of, or in addition to, an adjustment to a power level of an outbound transmission may be provided. As noted earlier, a SAR level represents a total amount of energy absorbed by a body. In addition or instead of adjusting a power transmission level to change a SAR level, other transmission parameters, such as the frequency of transmissions and the frequency band(s) of transmissions can also be adjusted, which will have an effect on the SAR level.

For example, by changing the transmission channel for communications sent to network 118 by device 116a a different power transmission level can be provided. Different channels within a band for a communication network may have different transmission characteristics associated with them, such as different transmission frequencies and different transmission power levels. As such, changing a transmission channel in a band may also have an effect of reducing a SAR level for device 116a.

Table E provides a non-exhaustive list of exemplary parameters that device 116a may set in addition to, or instead of, changing a power level for a transmission.

TABLE E

| Parameter | Notes |
|---|---|
| Channel | Change the channel(s) to be used for transmissions. |
| Data Rate used for Transmission | Change the data rate used to data transmissions, to reduce the total time for an effective transmission. |
| Probes for active scans | Change the maximum number of probes for active scanning may be made as some WLAN chipsets restrict the number of probe requests sent by a device, thereby limiting its transmissions. |

As another transmissions sent by device 116a may be put into a periodic sleep mode in a time cycle to reduce the total average time that device 116a is configured to send transmissions. This also has an effect of reducing the total average power of transmissions sent by device 116a. For example, device 116a may deactivate sending transmissions over network 118 for a time covering one beacon period (approximately 102.4 ms) once every X beacon periods, where X≥2. The period of temporary deactivations may be changed for different network conditions. The period may be automatically changed according to a script to increase or decrease the proportion of the sleep time as needed.

As an alternative implementation, adjustments may be implemented as a progression of operating modes for the communication networks. For example, when device 116a has its connection to WLAN radio is operating in STA mode in the 2.4 GHz band and the cellular radio is operating in LTE mode in Band 7 (B7), in one configuration, the WLAN radio is configured to operate in a WLAN power-save mode, which can reduce the duty cycle of transmissions and reduce the absorbed energy.

An embodiment provides additional configuration conditions for specific networks/operating conditions for device 116a. For example, when device 116a in communication with a WLAN network 118 in an ad-hoc configuration, as noted earlier, there is no AP for that specific network. As such, when a channel change is to be implemented for network 118, device 116a may simply identify an appropriate new channel based on data provided to it and reconfigure communications for network 118 to be carried on that new channel. An embodiment may provide similar transmission parameters when device 116a is operating in an ad hoc mode for a WLAN network. However, when device 116a is in communication with a WLAN network 118 where an AP and stations are provided, different channels may be selected depending on whether device 116a is acting as the AP for network 118 or simply as a station communicating with the AP. If device 116a is operating as the AP, device 116a may select a power level depending on the channel used. It may communicate information regarding this power level to the stations in network 118 through a "switch" message sent to the other devices. If device 116a is operating as a station, device 116a may select a power level that is the lower of the power level information received from the AP (from the switch command) or a level based on additional data for a transmission power level stored at device 116a (or accessible by device 116a). A lower power level provides greater power reduction.

It will be appreciated that in other embodiments, other conditions can be monitored, which may not be directly associated with a connection to a network (e.g. battery level in device 116a, current location in device 116a, recent idle time of device 116a, orientation of device 116a, etc.) and adjustments may be made to a transmission characteristic to one or more networks based, at least in part, on such conditions. For example, here are some exemplary situations where transmission power of signals to one or more networks communicating with device 116a may be implemented:

- if the battery level of device 116a is detected to be below a certain threshold, then a reduction in transmission power to one or more networks communicating with device 116a may be implemented;
- if device 116a is detected to be at or not at a certain location or in a certain state (e.g. at home, at an office, in transit, docked, in a sleep mode) and possibly for a certain amount of time, then a reduction/boost in transmission power to one or more networks communicating with device 116a may be implemented;
- if device 116a is detected to in a certain orientation (e.g. flat, indicating that it is not near a user's head, or upright, indicating that it is near a user's head) then a boost/reduction in transmission power to one or more networks communicating with device 116a may be implemented; and/or
- if a proximity or heat sensor in device 116a detects that device 116a is sufficiently near or sufficiently distant from a body (such as a user's head), then a reduction/boost in transmission power to one or more networks communicating with device 116a may be implemented.

It will be appreciated that other (local) operating/environment conditions for device 116a may also be used to act as a trigger condition for adjusting a connection parameter to a network.

Now, details are provided on another feature of an embodiment that adjusts parameters for communications for a communication device (such as device 116a) that are implemented under certain environments or conditions, for example, where simultaneous or near simultaneous transmissions to two different networks (such as to networks 112 and 118) may cause interference or degraded communication performance(s) to one or both networks. It will be appreciated that one or more aspects of this feature can be implemented independently and/or in conjunction with other features of an embodiment described herein.

In particular, an embodiment addresses radio-to-radio coexistence issues, where WAN 112 and WLAN 118 communications are being processed simultaneously or nearly simultaneously by device 116a. For example, for LTE transmissions that are provided at a particular frequency (such as in B7) and/or have been allocated a higher number of resource blocks (thereby increasing the bit rate for transmissions), these LTE transmissions may de-sense (i.e. lower the sensitivity) of received signals on a 2.4 GHz WLAN/Bluetooth transmissions at device 116a. In expressed values, a higher (negative) value for sensitivity (expressed typically as "–dBm") is a more sensitive value. Also, LTE signals received at device 116a may lose sensitivity in due in part to intermodulation of signals from one or both the WLAN and WAN transmissions into the LTE reception band. These two exemplary situations described for LTE and WLAN networks may be produced when signals from two or more other networks interact with each other.

To address such co-existence issues, an embodiment provides three features that may be implemented separately or together in various combinations. These features (alone or together in any combination) may also be combined with other signal adjustments described above.

A first feature is to apply filtering to one or both of communication signals (either transmitted or received signals) to one or both of the networks 112 and 118 at device 116a or elsewhere. Filtering may be provided in the frequency domain (e.g. a filter stage in a circuit at or near an antenna), the digital domain (e.g. a digital filter module that attenuates or removes digitally part of a signal) or both. Multiple filtering stages may be provided. One filtering stage addresses leakage between channels of the two networks, such as adjacent channel leakage from transmission signals from an LTE transmission into a WLAN received channel. For example, a filter may be provided at an output stage of transmission signals from device 116a for signals sent to network 112, which may be over LTE B7 transmissions. Additionally or alternatively, a band pass filter may be provided at the WLAN transmit/receive antenna designed to block/reduce LTE transmission signals received at the WLAN antenna. As such the band pass filter provides an out-of-band (for WLAN signals) block for the WLAN receiver.

A second feature provides a communication algorithm that attempts to reduce collisions between transmissions generated by device 116a for between networks 112 and 118. Specifically, modules may be provided to regulate timings of transmissions from device 116a for one or both of transmissions being sent to networks 112 and 118 such that a transmission for one network is not sent when a transmission (and/or a reception) of a communication from another network is expected by device 116a. For example, device 116a may avoid sending a transmission over network 112 when device 116a is receiving communications from network 118. This feature can be implemented via a hardware/software interface that bridges WLAN and cellular communications to monitor the communication status of both networks for device 116a and to make appropriate adjustments to the timing of transmissions for network 112 by device 116a to avoid such collisions. This can be accomplished, for example, by selecting time slot(s) for network 112 transmissions that do not overlap with receiving time slot(s) for network 118 receptions.

A third feature selectively reduces output power of transmissions sent to network 118 by device 116a. It has been observed that when simultaneous WLAN and LTE transmissions from device 116a were made, a loss in sensitivity was experienced that was due to intermodulation (active and/or passive) of both WLAN and LTE B7 transmissions. This may be due, at least in part, to interactions with the metal antennae in device 116a for the two networks, limited isolation of WLAN transmission signals between LTE antenna and radio frequency power amplifier of device 116a and other factors. As such, a third order intermodulation signals may be generated that fall into the LTE B7 receiving band, where their magnitudes may vary significantly. Sensitivities among different devices 116 in network 112 may vary dramatically among devices. The third feature has been found, in part, through experimental data to be effective in reducing intermodulation signals while not avoiding vulnerabilities of varying sensitivities among devices.

In one aspect, the third feature provides a dynamic power back-off regime for transmissions sent from device 116a over network 118, where the back-off is implemented under certain conditions for networks 112 and 118. The amount of power attenuation provided for the back-off to output signals sent to network 118 may depend on one or more of a degree of degradation downlink throughput in network 112. For example, for LTE B7 down link throughput, degradations may be due to simultaneous LTE B7 transmissions and WLAN transmissions from device 116a, which may not be present when device 116a is transmitting only on the LTE B7 network.

For a given WLAN 118 and a given WAN 112, each network's operating parameters, such as operating channels and frequencies for their respective transmissions, may be dynamically set. For example, WLAN transmissions may be carried in frequencies between 2412 MHz and 2472 MHz in 5 MHz increments and LTE B7 transmissions may be carried in frequencies between 2510 MHz and 2560 MHz in 10 MHz increments. As such, for a given pairing of current transmission frequencies for WAN and WLAN transmissions used by device 116a, an embodiment may or may not implement a power back-off for transmissions of WLAN signals from device 116a at a given frequency.

Table F provides an exemplary mapping of a set of WLAN transmission frequencies against a set transmission (Tx) and reception (Rx) frequencies for a LTE network used by device 116a and an indication of where there is an issue with IMS and other overlaps between the networks. Where there is an issue a change in a parameter of one or more transmissions/receptions in one or both of the networks may be implemented. For example a back-off of WLAN transmissions and/or a de sensing of LTE transmission signals may be provided. An empty cell indicates that no change in a parameter is warranted for either network. For example when device 116a is processing WLAN transmissions to network 118 at 2772 MHz, for the present LTE network 112, no change has been deemed to be required. Two types of changes are provided by an embodiment.

The first change is a back-off. A cell containing the label "back-off" indicates that a power back-off for the WLAN transmissions should be implemented. For example, when device 116a is processing WLAN transmissions to network 118 at 2417 MHz, for a LTE network 112, a WLAN back-off can be implemented when LTE transmissions are carried over the 2520 MHz, 2530 MHz, 2540 MHz and 2550 MHz bands, but not over the 2560 MHz band. Table F also shows overlaps between WLAN and LTE receptions.

A second change is a de-sensing of received signals for a network. For example, where an entry in Table F has a "WLAN Rx" entry, then for the corresponding pair of WLAN transmissions/receptions (at its noted frequency) and the corresponding communications received at the noted LTE frequency, there is a co-existence interference. In this overlap situation, the WLAN Rx signals may be sacrificed, i.e. the sensitivity for the Rx received signals may be reduced. Other combinations of other networks may have different back-off/de-sensitizing characteristics for transmitted and/or received signals for one and/or both networks.

TABLE F

| WLAN Chan. | WLAN Freq. MHz | LTE Tx Frequency (MHz) | | | | | |
|---|---|---|---|---|---|---|---|
| | | 2510 | 2520 | 2530 | 2540 | 2550 | 2560 |
| | | LTE Rx Frequency (MHz) | | | | | |
| | | 2630 | 2640 | 2650 | 2660 | 2670 | 2680 |
| 13 | 2472 | WLAN Rx | WLAN Rx | | | | |
| 12 | 2467 | WLAN Rx | WLAN Rx | | | | |
| 11 | 2462 | WLAN Rx | WLAN Rx | | | | |
| 10 | 2457 | WLAN Rx | WLAN Rx | | | | |
| 9 | 2452 | | | | | | Back-off |
| 8 | 2447 | | | | | | Back-off |
| 7 | 2442 | | | | | Back-off | Back-off |
| 6 | 2437 | | | | | Back-off | Back-off |
| 5 | 2432 | | | | Back-off | Back-off | Back-off |
| 4 | 2427 | | | | Back-off | Back-off | Back-off |
| 3 | 2422 | | | Back-off | Back-off | Back-off | Back-off |
| 2 | 2417 | | | Back-off | Back-off | Back-off | Back-off |
| 1 | 2412 | | Back-off | Back-off | Back-off | Back-off | |

As noted an embodiment provides a reduction in inter-modulation distortion in a WAN transmission band that has an operating frequency that is "close" to a transmission band of a WLAN network, such that a harmonic from signals for transmissions to the WLAN network (e.g. a first, second or third harmonic) may affect the intermodulation distortion of signals received (or transmitted) to the WAN network. However, it will be appreciated that in other embodiments, interference between communication signals (either received and/or generated at the device) for two (or more) networks may interfere with each other when the communication frequencies are not "close" (e.g. when distortions from a fourth or larger harmonic affect transmissions). As such, it will be appreciated that an embodiment may be provided that reduces interference of communications from a first network (e.g. network 112 or 118) from affecting communications from a second network (e.g. network 118 or 112).

Table G provides exemplary experimental data of improvements in sensitivities for signals received by an exemplary device 116a from network 112, when an output of transmissions sent by device 116a over network 118 (WLAN 118) are adjusted per the noted absolute power levels (e.g. 18, 15, 13 and 10 dBm), where the WLAN output is shown as an absolute output level, so a smaller number (closer to 0) is a smaller output level.

TABLE G

| LTE B7 Tx (MHz) | LTE B7 Rx (MHz) | Ref. Sens. (dBm) | WLAN Tx @18 dBm | WLAN Tx @15 dBm | WLAN Tx @13 dBm | WLAN Tx @ 10 dBm |
|---|---|---|---|---|---|---|
| 2510 | 2630 | −94.5 | −87.2 | −84.2 | −89.6 | −89.2 |
| 2520 | 2640 | −94.5 | −86.7 | −87.2 | −88.2 | −89.2 |
| 2530 | 2650 | −94.5 | −89.2 | −87.7 | −89.6 | −90.7 |
| 2540 | 2660 | −94.5 | −87.2 | −87.7 | −91.7 | −92.7 |
| 2550 | 2670 | −94.5 | −87.8 | −88.7 | −89.2 | −90.2 |
| 2560 | 2680 | −94.5 | −94.5 | −88.2 | −87.2 | −92.9 |
| Avg. Rx (dBm) | | −94.5 | −87.6 | −87.3 | −89.3 | −90.8 |

As shown, as the power level of the WLAN transmission decreases from 18 dBm to 10 dBm, the average reference sensitivity measured for received LTE signals increases from −87.6 to −90.8 dBm.

As an embodiment provides dynamic power back-off, the amount of attenuation can be changed dynamically depending on various conditions detected by device 116a for its operation and its connection(s) to networks 112 and 118. Various operating parameters for the back-off regime are noted below.

A threshold may be used and evaluated to determine when a back-off is provided and to identify an amount of back-off. For example, in one embodiment, if the current level of degradation of throughput for transmissions to network 112 from device 116a is below (or above) a predetermined threshold, then a back-off may be implemented (or not). For example, a degradation threshold (e.g. less than approximately 5-20% degradation) may be set that compares a downlink throughput to network 112 to throughput when there are no transmissions to WLAN 118 (or the connection to WLAN 118 is off). If the degradation is below the threshold, then no back-off is implemented. If the degradation is above the threshold, then a scaled back-off may be implemented.

The WLAN back-off may be enabled only if certain conditions are detected by device 116a for network 112 and/or network 118. For example, if device 116a is currently in a Mobile Hot Spot (MHS) mode for WLAN 118, then the back-off may not be implemented. This is because in the MHS mode, the WLAN radio may select a channel and the selected channel may not cause a received LTE communications to lose sensitivity.

The WLAN back-off may enabled only if certain other conditions are detected by device 116a. For example, if device 116a is currently near an AP, device 116a may be able to perform an alternative back-off regime. For example, a back-off may be implemented based on WLAN received transmission received signal strength indicator (RSSI), which indicates a distance between device 116a and the AP, so that when the distance exceeds a threshold, a back-off is not provided.

The amount of WLAN back-off (in dB) may be set depending on current operating conditions of device 116a for transmissions to networks 112 and/or 118. For example, depending on current transmit and receive frequency bands for network 112 communications (for an LTE network), different back-off parameters may be set for transmissions over network 118. For example, a WLAN power back-off that may affect LTE received signals may be implemented under certain conditions, such as only during simultaneous transmission of WLAN and LTE B7. In that situation a third order intermodulation distortion of WLAN transmissions at one frequency and LTE transmissions at another frequency may cause a decrease in sensitivity of LTE B7 received signals (e.g. between 2620 and 2690 MHz). Additionally or alternatively, the amount of back-off for a LTE receive de-sense may also be set based on expected "best"/"preferred" uplink and downlink throughput(s) of device 116a during simultaneous LTE B7 and WLAN operations conducted by device 116a.

The amount (in dB) of a WLAN back-off may be provided as an additional back-off to an existing adjustment (e.g. as an arithmetic sum of an existing adjustment). For example, if a back-off is already provided for a SAR adjustment (as noted earlier), then an additional back-off may be provided for WLAN transmissions during simultaneous transmissions to networks 112 (LTE B7) and 118 (WLAN) if the current amount of back-off does not meet an optimal coexistence system throughput, as described above.

The amount (in dB) of WLAN back-off may vary from device 116a to other devices, as the third order intermodulation may vary significantly from device to device.

In other embodiments, back-offs may be provided to transmissions sent by device 116a to network 112 (WAN), where such back-offs are controllable by device 116a or where device 116a may be able to send a command to network 112 to initiate such a back-off.

In other embodiments, other adjustments may be made to one or more parameters of transmitted or received signals from one or both of networks 112 and/or 118. Such adjustments may be made due to interference and/or distortions in their transmitted/received signals due to transmitted/received signals from another network. For example, the timing and/or size of transmissions may be adjusted (as noted above) and/or the timing and/or sensitivities for received signals may be adjusted.

It will be appreciated that the parameters in the Tables and paragraphs above may be changed from according to a program or script, where several changes are made to one or more parameters as part of the script. For example, when one network condition is detected, an exemplary program or script may change the transmission level and then channel based on a passage of time or detection of other subsequent network condition(s). Other programs can be provided. It will further be appreciated that conditions may be imposed on when, how and if to change the above noted parameters.

It will further be appreciated that the data for the parameters in the Tables and paragraphs noted above may be stored locally on device 116a or may be provided to device 116a from a remote server or other device. As such, updates to the data, parameters and/or Tables may be provided to device 116a from time to time to reflect amendments to the parameters implemented in view of any recent regulatory or operational changes or improvements.

Now detail on specific monitoring and adjustment mechanisms provided by embodiments is provided. In order to determine when to make an adjustment to one or more transmission parameters, an embodiment monitors continually for network(s) detected by device 116a. As such, as one connection to a network (either, for example, a connection to network 112 or 118) is established, strengthened, maintained, weakened and/or lost, depending on the current status of the connection, a parameter for communications transmitted to another network (for example network 118 or 112) may be adjusted.

In operation, device 116a has processes to monitor various network connections, such as WLAN and cellular connections (for example to networks 112 and 118) and to monitor states of connections (e.g. for a cellular network, a SVLTE state). In one embodiment, monitoring is provided by a component in an operating system of device 116a as this provides more flexibility for modifications. Upon detection of a state change, device 116a accesses data (such as states in the Tables noted above) and determines whether an adjustment is to be made to a parameter. If an adjustment is to be implemented, the adjustment that may be based on values in the Tables or on additional conditions and data. The component may be implemented as a software driver that can determine the state of connections for device 116a (e.g. the handset, cellular and SVLTE states); identify a parameter to be adjusted upon detection of a current state or a change in state; and implement the determined adjustment.

Figure 3:
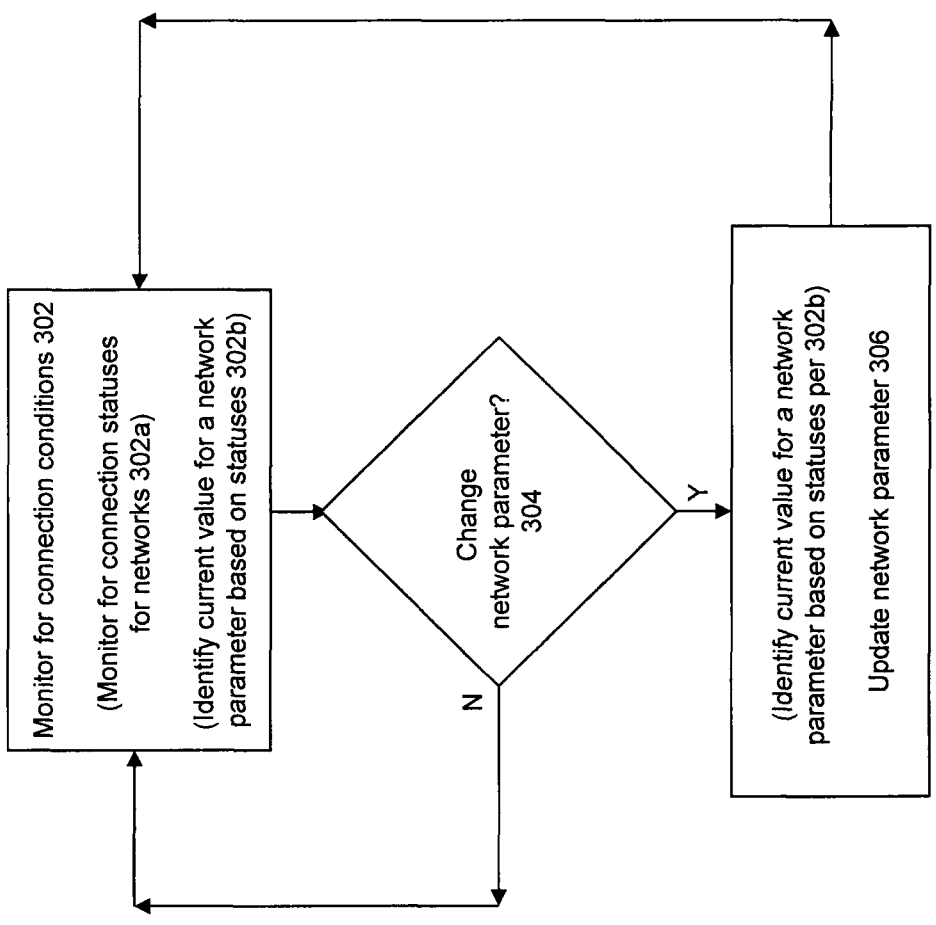
FIG. 3 is a flowchart of exemplary processes executed by the communication device of FIG. 1 in evaluating a connection to the cellular network and determining if an adjustment is to be provided to a communication parameter for the WLAN according to an embodiment.

Referring to FIG. 3, an embodiment may implement a start-up configuration process (not shown) for device 116a that accesses data on communication parameters and limits for any networks with which device 116a is currently in communications. The parameters may identify specific power transmission levels for transmissions based on current/recent/expected states of network connections for device 116a. The parameters may identify specific "de-sense" values for received signals based on current/recent/expected states of network connections for device 116a. Additionally or alternatively, the parameters may identify specific back-off of power transmission levels for transmissions based on current/recent/expected states of networks for device 116a.

After the start-up process, process 300 moves to process 302, where device 116a monitors conditions such as a network connection condition preferably with which device 116a has been recently or is currently communicating. This is akin to conditions described in above noted Tables A-G. Typically, process 302 may be provided in a background process that allows other actions and input/output signals to be conducted on device 116a; however, process 302 may be conducted in a dedicated monitoring loop, where no other functions are executed, while it is operating. Additionally or alternatively, some or all of the monitoring may be conducted from an external device (e.g. AP 110b or from a server in WLAN 118) and results of such external monitorings are provided to device 116a.

There are two components to process 302, each component may operate independently of the other and may be executed in any order. In some embodiments only one of the two components is provided. For the first component, process 302a monitors for connection statuses to networks usable by device 116a. For the second component at process 302b, depending on the detected connection statuses, a look-up is conducted for a current value for a parameter for a network connection is identified (e.g. per a lookup value in Tables A-E). Additionally or alternatively, a transmission power back-off assessment can be evaluated (for example to reduce IMS between LTE and WLAN signals as described above referring to Tables F and G).

In process 304, an assessment is made in regards to the detected network connection conditions and the previously-known network conditions. As part of the assessment, the status of connections to networks (such as networks 112 and 118) may also be evaluated against any related thresholds. For example, conditions for network connections may be evaluated as described in Tables A-E. Other network conditions as described herein may be also assessed. Briefly, process 304 determines whether an adjustment should be made to a communication parameter of a communication network that has been in communication with device 116a based on the above noted condition and if so, process 304 implements the adjustment to the communication parameter. Additionally or alternatively, a transmission power back-off value may be implemented per features described relating to Tables F and G.

If the detected network connection conditions are the same as the previously-known conditions, then there is no change in the network conditions and so, presumably, there is no adjustment to a communication parameter of the target network and the process loops back to process 302. However, if the conditions are the same in some circumstances an adjustment to a parameter may still be implemented.

If the detected network connection conditions differs from the previously-known conditions (or if there is another adjustment condition that is satisfied), then an adjustment to a communication parameter of the target network is to be implemented and the process moves to process 304.

In process 304, the parameter is adjusted. In process 302b, noted above, a look-up had been conducted for a current value for a parameter for a network connection. If process 302b had not been conducted, then its process is conducted in process 304. In any event, once the current value for the parameter is established, then in process 304, the adjustments are made to the corresponding transmission parameter(s) for the affected network. For example, if the look-up determined that a reduction of the power in transmissions from device 116a over network 118 are to be reduced by approximately 6 dB (or another value), then appropriate reconfigurations are made to the transmission output parameters for transmissions sent to network 118 by device 116a. Additionally or alternatively if the look-up determined that for the given operating parameters and frequencies that device 116a is using to communicate with networks 112 and 118, that a reduction of the power in transmissions from device 116a for network 118 should be implemented, then appropriate reconfigurations are made to the transmission output parameters for transmissions sent to network 118 by device 116a.

Although process 300 describes processes and facilities for device 116a to identify conditions and parameters for adjusting transmission levels for output signals sent to a network, other embodiments may provide adjustments that do not relate to network 118 or network 112.

An embodiment may implement part of all of functions described in process 300 in different orders or through different mechanisms (e.g. such as through a state machine). Process 300 may be operating in the background of device 116a. Process 300 may be implemented in an application program interface (API) that allows software and applications operating on device 116a to access the functionality of the API through a program call. As such, in an API, several calls may be received from several different applications operating on device 116a. In such a situation, the API may arbitrate among received requests to rank and/or combine the requests to determine overall parameters that are to be made for transmissions to network 118 and/or 112.

In other embodiments, the features of process 300 may be embedded in applications operating on other devices, such as AP 110b and results can be sent to device 116a. As such, other processes and applications may be concurrently operating on device 116a or other devices.

While not shown in process 300, a stop condition may be provided to exit process 300. The stop condition(s) may be incorporated as part of process 302 and 304 and upon satisfaction of the stop condition(s), process 300 would end. As such, upon satisfaction of the stop condition, an embodiment would discontinue to send further network scan messages to the network. It will be appreciated that processes 302, 304 and 306 may be executed in different orders and at different times than provided in process 300. It will be seen that process 300 may receive and react to external triggers and signals from device 116a to re-start process 300 (e.g. user intervention) to minimize process "freezing" conditions. For example, if device 116a is turned off and then turned on a network scan may be immediately useful to device, 116a and as such, if process 300 had previously been activated, it may be terminated and a "hard" network scan request may be initiated.

Figure 4:
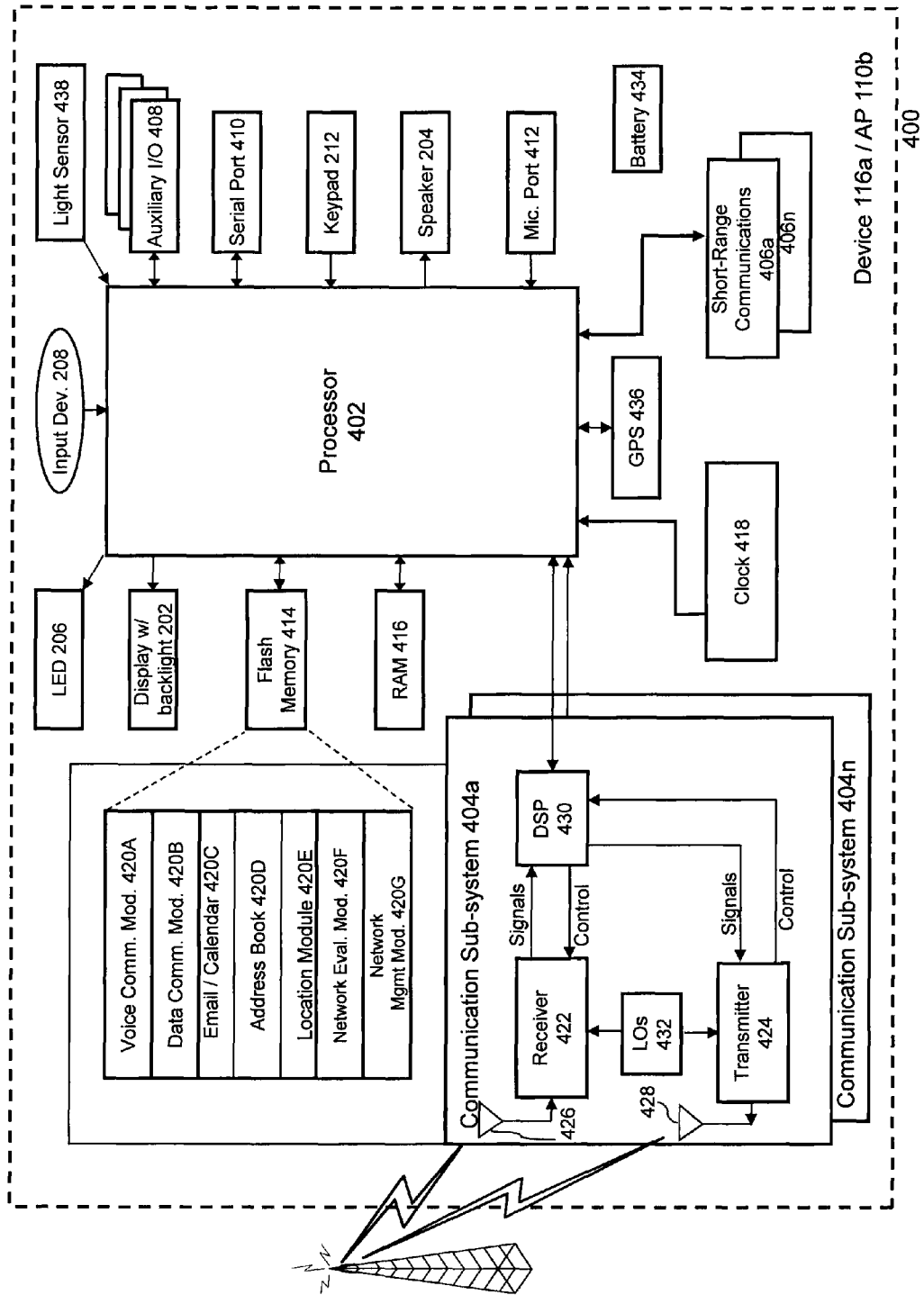
FIG. 4 is a block diagram of internal components of the communication device of FIG. 1.

Referring to FIG. 4, with aspects of main features of an embodiment described, further detail is now provided on internal components in device 116a, which may be also found in device 104d and AP 110b. Functional components of device 116a are provided in schematic 400. The functional components are generally electronic, structural or electromechanical devices. In particular, processor 402 is provided to control and receive almost all data, transmissions, inputs and outputs related to device 116a. Processor 402 is shown schematically as coupled to keypad 212 and other internal devices. Processor 402 preferably controls the overall operation of device 116a and its components. Exemplary processors for processor 402 include processors in the Data 950 (trade-mark) series, the 6200 series and the PXA900 series, all available at one time from Intel Corporation. Processor 402 is connected to other elements in device 116a through a series of electrical connections to its various input and output pins. Processor 402 has an IRQ input line which allows it to receive signals from various devices and modules. Appropriate interrupt firmware is provided which receives and reacts to the signals detected on the IRQ line. An interrupt signal may be used to indicate a request to terminate the segmented scanning mode of an embodiment.

In addition to processor 402, other internal devices of device 116a are shown schematically in FIG. 4. These include: display 202; speaker 204; keypad 212; communication sub-system 404; short-range communication sub-system 406; auxiliary I/O devices 408; serial port 410; microphone port 412 for microphone 216; flash memory 414 (which provides persistent storage of data); random access memory (RAM) 416; clock 418 and other device sub-systems (not shown). Device 116a is preferably a two-way radio frequency (RF) communication device having voice and data communication capabilities. In addition, device 116a preferably has the capability to communicate with other computer systems via the Internet.

Operating system software executed by processor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by device 116a may also be stored to RAM 416.

In addition to an operating system operating on device 116a, additional software modules 420 enable execution of software applications on device 116a that provide instructions for execution on the processor of device 116a. A set of software (or firmware) applications, generally identified as modules 420, that control basic device operations, such as voice communication module 420A and data communication module 420B, may be installed on device 116a during manufacture or downloaded thereafter. As well, other software modules are provided, such as email/calendar module 420C, address book 420D, location module 420E and network evaluation module (NEM) 420F. NEM 420F implements processes to evaluate network connections and to identify and initiate changes to network communication parameters per process 300. For example, data relating to network operation/configuration parameters such as those provided in Tables A-G may be accessed to determine whether an adjustment is to be made and if so, what adjustments. As such, NEM 420F may have call routines built into it to make one or more calls to an API (as described herein) to request that device 116a retrieve network connection information on one or more networks. The content and frequency of the API calls can be tailored to the requirements of the API, as described herein. In another embodiment, a plurality of NEMs 420F may be provided, with each implementing processes to evaluate specific network connections (e.g. LTE, CDMA, etc.) and operating parameters (e.g. what frequencies are being used for a given network).

Messages received and/or generated by any module 420 may be processed by data communications module 420B. Messages may be transmitted/received in network layer communications, emails, and/or other messaging systems to network 118, AP 110b and/or devices 116. Module 420B receives messages from external devices, extracts relevant information from them and provides the information to relevant modules. Module 420B notifications from modules 420, extracts relevant information from them and generates and sends messages containing relevant information to the messages to network 118, including to devices 110. Messages relating to network 112 for device 116a, when operating as an AP may be processed separately by the modules from other non-network 118 communications (e.g. cellular communications).

Network management module (NMM) 420G provides an interface from NEM 420F to any of communication sub-system 404n, short range communication system 406, voice communication module 420A and data communication module 420B to receive parameter adjustment instructions from NEM 420F and to identify and provide appropriate adjustments to the identified parameter for the affected network as identified in process 300. Such adjustments may include reductions to transmission signals sent by device 116a to WLAN 118 in order to reduce the sensitivity of NMM 420G is software and/or firmware that processes network functions for network 118 for device 116a. In an embodiment NMM 420G receives request for a network parameter adjustment from NEM 420F and implements same on the appropriate network. Depending on the values of the parameters, NMM 420G may cause an output transmission level for a network to be adjusted on device 116a following parameters identified Tables A-G, for example. NMM 420G may also receive signals from other modules (or from other devices communicating with device 116a) to implement such parameter adjustments. Processes to evaluate and authenticate adjustment requests from other devices may be provided in NMM 420G. Communications also can be processed with an external server. Functions of NMM 420G may be distributed to other modules 420 in device 116a. In another embodiment, a plurality of NMMs 420G may be provided, with each implementing processes to adjust specific network connections (e.g. LTE, CDMA, etc.) and operating parameters (e.g. what frequencies are being used for a given network).

For a device architecture model, such as the OSI model, NMM 420G provides functionality above a radio layer and monitors and communicates state changes to a NEM 420F that is associated with each radio. NEM 420F is responsible for conducting data and table lookups and to configure a power transmission parameter (e.g. either as a limit or a minimum value) or any other parameter on the radio.

Additional modules such as personal information manager (PIM) application may be provided. Any module may be installed during manufacture or downloaded thereafter into device 116a.

Data associated with each module, the status of one or more networks, profiles for networks and trigger conditions for commands for networks may be stored and updated in flash memory 414.

Communication functions, including data and voice communications, are performed through communication sub-systems 404a . . . n and short-range communication sub-system 406. Collectively, sub-systems 404 and 406 provide the signal-level interface for all communication technologies processed by device 116a. Various applications 420 provide the operational controls to further process and log the communications. Communication sub-system 404 includes receiver 422, transmitter 424 and one or more antennas, illustrated as receive antenna 426 and transmit antenna 428. A filter may be provided in transmitter 424 and/or around antenna 428 (not shown) to block out signals that are outside an expected frequency range of signals transmitted by transmitter 424. Such a filter may operate as a band pass filter to reduce intermodulation distortion on other signals. In addition, communication sub-system 404 also includes processing modules, such as digital signal processor (DSP) 430 and local oscillators (LOs) 432. The specific design and implementation of communication sub-system 404 is dependent upon the communication network in which device 116a is intended to operate. For example, communication sub-systems 404a ... n of device 116a may collectively operate on network technologies described earlier (e.g. NFC, GPRS, IEEE 802.11 networks, IEEE 802.11 P2P networks, Bluetooth networks, Zigbee, television-band whitespaces or other geo-location database dependent technologies, AMPS, TDMA, CDMA, CDMA 2000, PCS, GSM, WWAN, WMAN, WLAN, WPAN, IM, TM, SMS, etc.). Separate sub-systems 404a ... n may be provided for different communication technologies in device 116a. Each sub-system 404a ... n may generate independent signals and provide same to other modules in device 116a and similarly other modules in device 116a may generate and provide separate signals to individual sub-systems 404a ... n. Separate antennae 426, 428 may be provided for each communication network (e.g. LTE, UMTS, etc.) for each sub-system 404a ... n. Some exemplary sub-systems 404 include: cellular sub-system 404a, WLAN sub-system 404b and others. One configuration for sub-systems 404a ... n provide separate antennae for different communication system (e.g. an 802.11 antennae is separate from an LTE or UMTS sub-system). Signals from modules 404 may be analyzed (by other modules in device 116a) as received signal strength indicators (RSSI) to determine whether a connection to the related network is active or not for device 116a.

Short-range communication sub-system 406 enables communication between device 116a and other proximate systems or devices, which need not necessarily be similar devices. In one embodiment, several sub-systems 406a ... n may be provided for different communication technologies. For example, the short-range communication sub-system may include an infrared device and associated circuits and components, a Wi-Fi or a Bluetooth (trade-mark) communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430.

For an 802.11 sub-system 404, a particular operational aspect of its receiver 422 and antenna 426 is that they need to be tuned to receive signals in the IEEE 802.11 network bands, e.g. signals in the 2.4 GHz to 6 GHz range for sub-systems 406 and if needed, sub-system 404. A filter may be provided in receiver 422 and/or around antenna 426 (not shown) to block out signals that are outside an expected frequency range of signals for sub-system 404. Such a filter may operate as a band pass filter to reduce intermodulation distortion. Additional filters on antenna may also be used to provide such functionality.

Receiver 422 and antenna 426 provide at least some of the hardware and software elements needed to detect when device 116a is in the presence of communication signals from networks 118 and 112.

It will be appreciated that in other embodiment, different architectures can be implemented to provide the functionalities of NEM 420F, NMM 420G, sub-systems 404a ... n and sub-system 406a ... n. For example, network analysis and/or network transmission updates may be processed through one or more central modules. Additionally or alternatively, some functions may be provided by modules/devices remote to device 116a. For example, information regarding network conditions may be sent to device 116a from an external source (such as an AP, a server or another device 116).

Powering electronics of device 116a is power source 434. In one embodiment, the power source 434 includes one or more batteries. In another embodiment, power source 434 is a single battery pack, especially a rechargeable battery pack. A power switch (not shown) provides an "on/off" switch for device 116a. A power source interface (not shown) may be provided in hardware, firmware, software or a combination of such elements to selectively control access of components in device 116a to power source 434. Upon activation of the power switch an application 420 is initiated to turn on device 116. Upon deactivation of the power switch, an application 420 is initiated to turn off device 116. Power to device 116a may also be controlled by other devices and by software applications 420.

Device 116a may also have global positioning system (GPS) 436 to assist in identifying a present location of device 116a and may also have light sensor 438 to provide data on the ambient light conditions for device 116a.

Although an embodiment has been described in terms of identifying/maintaining server/client device hierarchies in a wireless network, such as an IEEE 802.11 network, the features of an embodiment may be provided in coordinate aspects of different connections among different devices in different networks.

It will be appreciated that NEM 420F, NMM 420G and other modules in the embodiments may be implemented using known programming techniques, languages, processes and algorithms. Although the modules, processes and applications described are implemented in device 116a, it will be appreciated that some functions of the modules may be provided in a separate server that is in communication with device 116a. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 116a may be executing concurrently with other modules. As such, any of modules 420 (or parts thereof) may be structured to operate in as a "background" application on device 116a, using programming techniques known in the art.

In one configuration for the networks described herein, a transceiver and devices in the network have a "server/client" relationship, where the transceiver is a "server" device for the network and the devices are the "clients". The terms "server/clients" refer generally to devices that are related in some hierarchical manner (e.g. with a designated parent) or nonhierarchical network (e.g. in a peer-to-peer network). Other terms may be used to describe comparable device relationships for an embodiment, such as "master/slave", "network node/client", "access point/clients", "AP/nodes", etc.

It will be appreciated that the embodiments relating to client devices, server devices and systems may be implemented in a combination of electronic modules, hardware, firmware and software. The firmware and software may be implemented as a series of processes, applications and/or modules that provide the functionalities described herein. The modules, applications, algorithms and processes described herein may be executed in different order(s). Interrupt routines may be used. Data, applications, processes, programs, software and instructions may be stored in volatile and non-volatile devices described and may be provided on other tangible medium, like USB drives, computer discs, CDs, DVDs or other substrates herein and may be updated by the modules, applications, hardware, firmware and/or software. The data, applications, processes, programs, software and instructions may be sent from one device to another via a data transmission.

As used herein, the wording "and/or" is intended to represent an inclusive-or. That is, "X and/or Y" is intended to mean X or Y or both.

In this disclosure, all adjustment values, decrease values, cutoff values, thresholds and measured value are provided as an approximate value (for example, when the adjustment values is qualified with the word "about"), a range of values will be understood to be valid for that value. For example, for an adjustment value stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given condition or threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method of adjusting communication parameters for networks communicating with a communication device, the method comprising:
monitoring for a condition relating to a cellular communication network that has been in communication with the communication device; and
in response to determining that an adjustment is to be implemented on a communication parameter of a Wireless Local Area Network (WLAN) that has been in communication with the communication device based on the condition, implementing the adjustment to the communication parameter for the WLAN;
wherein the condition relates to communication frequencies used in the cellular communication network and communication frequencies used by the communication device for communications to the WLAN; and,
wherein the adjustment comprises reducing a transmission power level for communications sent by the communication device over the WLAN following a back-off scheme to reduce intermodulation distortion at the cellular communication network.

2. The method of adjusting communication parameters for networks as claimed in claim 1, wherein:
reducing the transmission power level enables the communication device to comply with a specific absorption rate (SAR) limit for transmissions sent from the communication device.

3. The method of adjusting communication parameters for networks as claimed in claim 1, wherein:
a transmission band associated with the cellular communication network determines a level of reduction in the transmission power level.

4. The method of adjusting communication parameters for networks as claimed in claim 1, further comprising:
monitoring for a second condition relating to the cellular communication network that has been in communication with the communication device; and
in response to determining that a further adjustment is to be made to the communication parameter of the WLAN that has been in communication with the communication device based on the second condition, implementing the further adjustment to the communication parameter for the WLAN.

5. The method of adjusting communication parameters for networks as claimed in claim 4, wherein:
the second condition is a loss of the connection to the cellular communication network; and
the further adjustment comprises increasing the transmission power level for communications sent by the communication device over the WLAN.

6. The method of adjusting communication parameters for networks as claimed in claim 1, wherein:
the adjustment further comprises changing a channel for communications sent by the communication device over the WLAN.

7. The method of adjusting communication parameters for networks as claimed in claim 1, wherein:
the adjustment further comprises periodically placing the communications sent by the communication device in a sleep mode.

8. The method of adjusting communication parameters for networks as claimed in claim 1, wherein:
the communication device is an access point (AP) in the WLAN.

9. The method of adjusting communication parameters for networks as claimed in claim 1, wherein:
the communication device is a station in the WLAN communicating with a second communication device that is an access point (AP) for the WLAN;
data for a first adjustment level for the reduction in the power transmission level is provided to the communication device; and
the communication device selects either the first adjustment level or a second adjustment level as the adjustment for communications sent by the communication device over the WLAN.

10. The method of adjusting communication parameters for networks as claimed in claim 9, wherein:
the communication device selects the greater reduction provided by either the first adjustment level or the second adjustment level as the adjustment for communications sent by the communication device over the WLAN.

11. The method of adjusting communication parameters for networks as claimed in claim 4, wherein:
the second condition is determination of the communication device being at a predetermined location.

12. The method of adjusting communication parameters for networks as claimed in claim 4, wherein:
the second condition is determination of the communication device being in a predetermined orientation.

13. The method of adjusting communication parameters for networks as claimed in claim 1, further comprising:
providing updated data for a first adjustment level for the reduction reflecting a further adjustment level conforming to a new regulatory requirement.

14. A system for adjusting communication parameters for networks communicating with a communication device, the system comprising:
a processor;
a memory module for storing instructions for execution on the processor; and
a monitoring module for providing instructions for execution on the processor to monitor for a condition relating to a cellular communication network that has been in communication with the communication device; and
in response to determination an adjustment is to be made to a communication parameter of a Wireless Local Area Network (WLAN) that has been in communication with the communication device based on a condition, implement the adjustment to the communication parameter for the WLAN;
wherein the condition relates to communication frequencies used in the cellular communication network and communication frequencies used by the device for communications to the WLAN; and,
wherein the adjustment comprises reducing a transmission power level for communications sent by the communication device over the WLAN following a back-off scheme to reduce intermodulation distortion at the cellular communication network.

15. The system for adjusting communication parameters for networks as claimed in claim 14, wherein:
the reduction in the transmission power level for communications sent by the communication device over the WLAN enables the communication device to comply with a specific absorption rate (SAR) limit for transmissions sent from the communication device; and
a transmission band associated with the cellular network determines a level of reduction in the transmission power level.

16. The system for adjusting communication parameters for networks as claimed in claim 14, wherein the monitoring module provides further instructions for execution on the processor to:
monitor for a second condition relating to the cellular communication network that has been in communication with the communication device; and in response to a determination that a further adjustment is to be made to the communication parameter of the WLAN that has been in communication with the communication device based on the second condition, implement the further adjustment to the communication parameter for the WLAN.

17. The system for adjusting communication parameters for networks as claimed in claim 14, wherein the monitoring module provides further instructions for execution on the processor to:
monitoring for a second condition relating to the cellular communication network that has been in communication with the communication device; and in response to a determination that a further adjustment is to be made to the communication parameter of the WLAN that has been in communication with the communication device based on the second condition, implementing the further adjustment to the communication parameter for the WLAN.

18. The system for adjusting communication parameters for networks as claimed in claim 17, wherein the monitoring module provides further instructions for execution on the processor to:
the second condition is a loss of the connection to the cellular communication network; and
the further adjustment comprises increasing in the transmission power level for communications sent by the communication device over the WLAN.

19. The system for adjusting communication parameters for networks as claimed in claim 14, wherein:
the adjustment further comprises changing a channel for communications sent by the communication device over the WLAN.

20. The system for adjusting communication parameters for networks as claimed in claim 14, wherein:
the adjustment further comprises periodically placing the communications sent by the communication device in a sleep mode.

* * * * *